(12) United States Patent
Deng et al.

(10) Patent No.: US 10,346,606 B2
(45) Date of Patent: Jul. 9, 2019

(54) GENERATION OF A CAPTCHA ON A HANDHELD TOUCH SCREEN DEVICE

(71) Applicant: INTERNATIONAL BUSINESS MACHINES CORPORATION, Armonk, NY (US)

(72) Inventors: Bai Chen Deng, Beijing (CN); Qiang B J Han, Beijing (CN); Qiang Li, Beijing (CN); Yan Yan S Su, Beijing (CN); Yue H Wang, Beijing (CN); Chuan Jie Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/678,154

(22) Filed: Aug. 16, 2017

(65) Prior Publication Data
US 2019/0057206 A1     Feb. 21, 2019

(51) Int. Cl.
*G06F 21/36* (2013.01)
*H04L 29/06* (2006.01)
*G06F 3/0488* (2013.01)

(52) U.S. Cl.
CPC .............. *G06F 21/36* (2013.01); *H04L 63/06* (2013.01); *G06F 3/04886* (2013.01); *G06F 2221/2133* (2013.01)

(58) Field of Classification Search
CPC .............. G06F 21/36; G06F 2221/2133; G06F 3/04886; H04L 63/06
See application file for complete search history.

(56) References Cited

U.S. PATENT DOCUMENTS

| | | | |
|---|---|---|---|
| 8,590,026 B2 | 11/2013 | Kumar et al. | |
| 8,671,058 B1 * | 3/2014 | Isaacs | G06F 21/36 382/100 |
| 8,978,121 B2 | 3/2015 | Shuster | |
| 9,192,861 B2 | 11/2015 | Gross | |
| 9,361,446 B1 * | 6/2016 | Demirjian | G06F 21/36 |
| 10,049,202 B1 * | 8/2018 | Johansson | G06F 21/36 |
| 2009/0106827 A1 * | 4/2009 | Cerruti | G06F 21/31 726/7 |

(Continued)

FOREIGN PATENT DOCUMENTS

| | | | | |
|---|---|---|---|---|
| EP | 2330529 A2 | 8/2011 | | |
| WO | WO-2015074496 A1 * | 5/2015 | | G06T 11/60 |

OTHER PUBLICATIONS

Reynaga et al., "Exploring the Usability of CAPTCHAS on Smartphones: Comparisons and Recommendations," USEC '15, Feb. 8, 2015, San Diego, CA, USA, Copyright 2015 Internet Society, ISBN 1-891562-40-1, pp. 1-10.

(Continued)

*Primary Examiner* — Darren B Schwartz
(74) *Attorney, Agent, or Firm* — Jordan T. Schiller

(57) ABSTRACT

Embodiments of the present disclosure relate to a CAPTCHA generation method. According to the method, a request for accessing a resource is received from a handheld touch screen device. A default virtual keyboard type is received from the handheld touch screen device. In response to the request, a CAPTCHA is generated based on the default virtual keyboard type. The CAPTCHA is sent to the handheld touch screen device.

12 Claims, 6 Drawing Sheets

(56) References Cited

U.S. PATENT DOCUMENTS

| | | | |
|---|---|---|---|
| 2009/0150983 A1* | 6/2009 | Saxena | G06F 21/36 726/7 |
| 2009/0235327 A1* | 9/2009 | Jakobsson | G06F 21/31 726/2 |
| 2009/0325661 A1* | 12/2009 | Gross | A63F 13/12 463/9 |
| 2011/0196722 A1* | 8/2011 | Punera | G06Q 30/0185 705/14.11 |
| 2011/0225633 A1* | 9/2011 | Pai | G06F 21/31 726/5 |
| 2011/0283346 A1* | 11/2011 | Li | G06F 21/36 726/7 |
| 2012/0110663 A1* | 5/2012 | Kim | G06F 21/36 726/19 |
| 2012/0246737 A1* | 9/2012 | Paxton | G06F 21/316 726/27 |
| 2012/0260326 A1* | 10/2012 | Steigmann | H04L 63/083 726/7 |
| 2012/0323700 A1* | 12/2012 | Aleksandrovich | G06F 21/36 705/14.69 |
| 2013/0031640 A1* | 1/2013 | Fisk | G06F 21/36 726/28 |
| 2013/0160095 A1* | 6/2013 | Seleznyov | G06F 21/36 726/5 |
| 2015/0170204 A1* | 6/2015 | Inbar | G06O 30/02 705/14.55 |
| 2015/0195289 A1 | 7/2015 | Kalgi et al. | |
| 2016/0055329 A1* | 2/2016 | Akula | G06F 21/36 726/7 |
| 2016/0103983 A1 | 4/2016 | Brown et al. | |
| 2016/0173527 A1 | 6/2016 | Kasman et al. | |
| 2016/0224783 A1 | 8/2016 | Jakobsson et al. | |
| 2016/0330235 A1 | 11/2016 | Thompson | |
| 2016/0359838 A1* | 12/2016 | Dasgupta | H04L 63/083 |
| 2017/0366564 A1* | 12/2017 | Ping | G06F 21/36 |

OTHER PUBLICATIONS

Reynaga et al., "Heuristics for the Evaluation of Captchas on Smartphones," Proceedings of the 2015 British HCI Conference, Jul. 13-17, 2015, Lincoln, United Kingdom, Copyright 2015 held by the owner/author(s), pp. 1-10.

Reynaga, "The Usability of Captchas on Mobile Devices," Thesis submitted to the School of Computer Science at Carleton University, Ottawa, Ontario, Sep. 2015, Copyright by Gerardo Reynaga, 2015, pp. 1-165.

Reynaga et al., "The Useability of Captchas on Smartphones," School of Computer Science, Carleton University, Ottawa, Canada, International Conference on Security and Cryptography (SECRYPT), Jan. 2013, pp. 1-8.

* cited by examiner

GENERATION OF A CAPTCHA ON A HANDHELD TOUCH SCREEN DEVICE

BACKGROUND

The present invention relates to security access and more specifically, to the generation of a Completely Automated Public Turing test to tell Computers and Humans Apart (CAPTCHA) on a handheld touch screen device.

A CAPTCHA is a type of challenge-response test used in computing to determine whether or not the user is human. A CAPTCHA involves a computer, typically a server, which asks a user to complete a test. Because computers are unable to solve the CAPTCHA, any user entering a correct solution is presumed to be human.

Malicious users can create automated processes which may include registering for services or e-mail accounts, downloading programs, and entering passwords. CAPTCHAs are popularly used on websites of banks as a form of protection from malicious programs.

According to current CAPTCHA generation mechanisms, a random alpha-numeric sequence is normally generated for a CAPTCHA. A common type of CAPTCHA requires that the user type the text of a distorted image in a text box, e.g., text that is written in a wavy font, sometimes with the addition of an obscured sequence of alphabets or numbers that appear on the user interface of the computer.

SUMMARY

According to one embodiment of the present invention, a CAPTCHA generation method is provided. According to the method, a server receives a request to access a resource from a handheld touch screen device, wherein the request includes a default virtual keyboard type of the handheld touch screen device. The server generates a CAPTCHA based on the default virtual keyboard type, and the server transmits the generated CAPTCHA to the handheld touch screen device.

According to one embodiment of the present invention, a CAPTCHA generation method is provided. According to the method, a request for accessing a resource is received from a handheld touch screen device. A default virtual keyboard type is received from the handheld touch screen device. In response to the request, a CAPTCHA is generated based on the default virtual keyboard type. The CAPTCHA is sent to the handheld touch screen device.

According to one embodiment of the present invention, there is provided a CAPTCHA generation system comprising a computer processor coupled to a computer-readable memory unit, said memory unit comprising instructions that when executed by the computer processor implements a method. According to the method, a server receives a request to access a resource from a handheld touch screen device, wherein the request includes a default virtual keyboard type of the handheld touch screen device. The server generates a CAPTCHA based on the default virtual keyboard type, and the server transmits the generated CAPTCHA to the handheld touch screen device.

According to one embodiment of the present invention, there is provided a computer program product for generating a CAPTCHA, the computer program product comprising a computer readable storage medium having program instructions embodied therewith, the program instructions executable by a device to cause the electronic device to perform a method. The method comprises receiving, by a server, a request to access a resource from a handheld touch screen device, wherein the request includes a default virtual keyboard type of the handheld touch screen device. The method further comprises generating, by a server, a CAPTCHA based on the default virtual keyboard type, and transmitting, by the server, the generated CAPTCHA to the handheld touch screen device.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
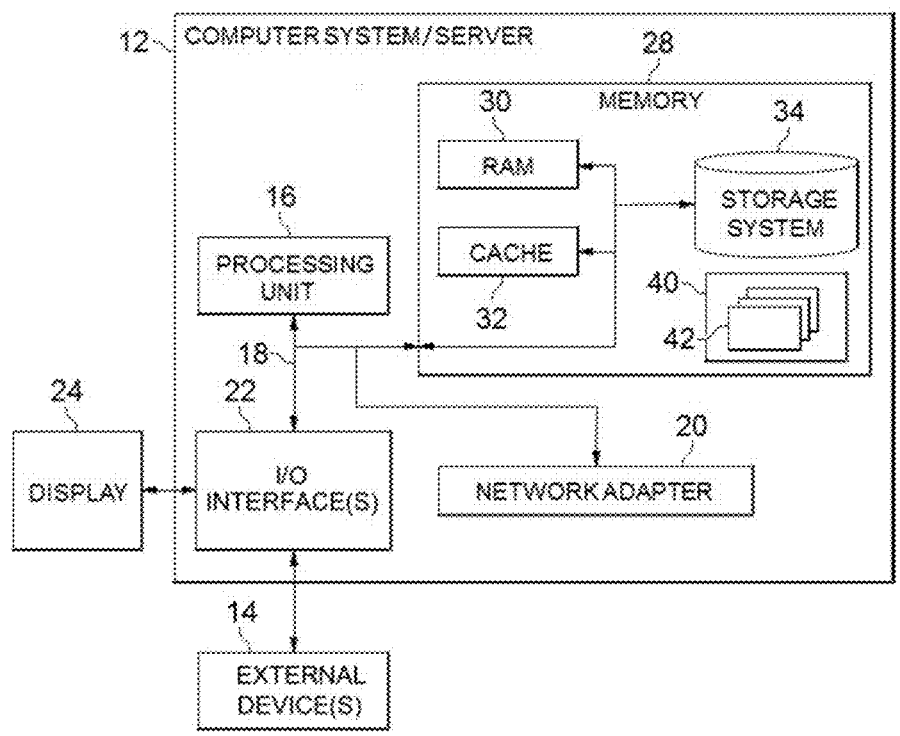
FIG. 1 shows an exemplary computer system which is applicable to implement the embodiments of the present invention.

Referring now to FIG. 1, in which an exemplary computer system/server 12, which is applicable to implement the embodiments of the present invention, is shown. FIG. 1 is also adapted to depict an illustrative example of a portable electronic device such as a communication device which is applicable for implementing the embodiments of the present invention. Computer system/server 12 is only illustrative and is not intended to suggest any limitation as to the scope of use, or functionality, of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Due to the restriction of the screen size, several types of the virtual keyboard are provided on a handheld touch screen device, including an alphabet virtual keyboard, a numeric virtual keyboard, a scratchable-latex virtual keyboard and a full-size virtual keyboard. Some handheld touch screen devices do not even support a full-size virtual keyboard, which means alphabet and numeric keys are provided in a separate virtual keyboard. Although some handheld touch screen devices support a full-size virtual keyboard, users have to switch between other virtual keyboard types and a full-size virtual keyboard, which causes a lot of inconvenience and time cost. The image recognition CAPTCHA requires users to identify the correct image from some images. Although it is not necessary for users to input the text, it is not commonly used as a CAPTCHA for its high cost. Therefore, it would be advantageous to provide an improved CAPTCHA that is easier for users to type a text CAPTCHA.

Figure 2:
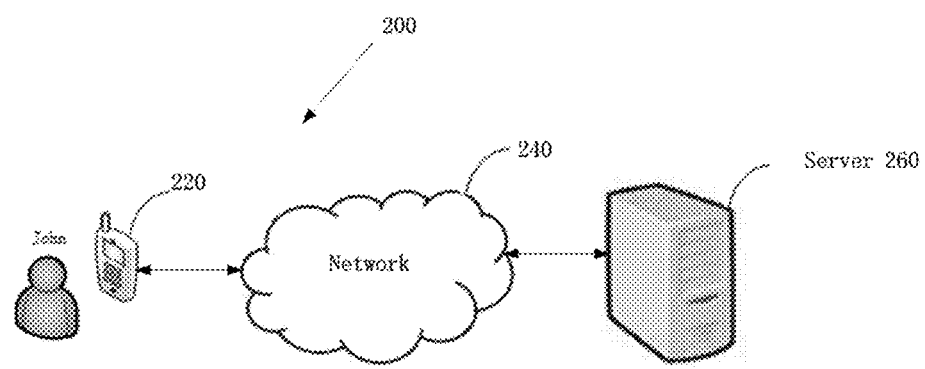
FIG. 2 shows an environment 200 in which the present disclosure can be practiced, in accordance with an embodiment of the present invention.

FIG. 2 shows an environment 200 in which the present disclosure can be practiced, in accordance with an embodiment of the present invention. The environment 200 comprises a handheld touch screen device 220, a network 240 and a server 260. The handheld touch screen device may be a smart phone, a personal digital assistant and so on.

The server 260 receives a request for accessing a resource from the handheld touch screen device 220. The server 260 then generates and stores a CAPTCHA to test a human presence at the handheld touch screen device 220. The handheld touch screen device 220 may show the CAPTCHA on its touch screen to the user and receive a user response. The user response is then transmitted to the server 260 for authentication. Once the user response matches with the predetermined response for the CAPTCHA, the server 260 allows the user to access the resource on the server 260. However, if the user response does not match with the predetermined response for the CAPTCHA, the server 260 does not allow the user to access the resource on the server 260.

The following illustrates various communications between the handheld touch screen device 220 and the server 260 in accordance with one embodiment of present disclosure. A request for accessing resources is transmitted from the handheld touch screen device 220 to the web server 260 through the network 240. The resource requested may be any resource of the website which has implemented the CAPTCHA mechanism in accordance with the embodiment of this disclosure. In response to the request, a default virtual keyboard type of the handheld touch screen device 200 is acquired from the handheld touch screen device 220 side, and is transmitted to the server 260, herein the default virtual keyboard type may be automatically configured by the system of the handheld touch screen device. It can be understood by persons ordinarily skilled in the art, that the default virtual type may also be configured by users according to their preferences. A CAPTCHA is then generated based on the received default virtual keyboard type of the handheld touch screen device 220 from the server 260 side. The resource comprising the CAPTCHA is loaded to the handheld touch screen device 220. The CAPTCHA generation method according to the embodiments of the present disclosure does not need users to switch between different types of virtual keyboards, and brings convenience to the user.

Figure 3:
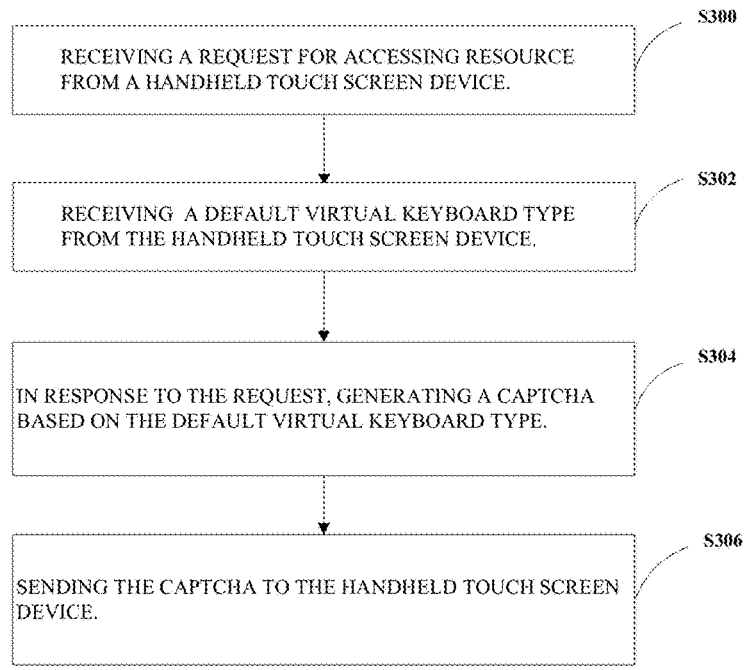
FIG. 3 describes an example method for generating a CAPTCHA for a handheld touch screen device, from the server side, in accordance with one embodiment of the present invention.

The following will describe the method for generating a CAPTCHA in accordance with the present disclosure from the server side and the handheld touch screen device side respectively. FIG. 3 describes an example method for generating a CAPTCHA for a handheld touch screen device from the server side according to one embodiment of the present disclosure. The method shown in FIG. 3 may be performed by the server. The method comprises the following steps.

At step S300, receiving a request for accessing a resource from a handheld touch screen device.

At step S302, receiving a default virtual keyboard type from the handheld touch screen device.

At step S304, in response to the request, generating a CAPTCHA based on the default virtual keyboard type. According to conventional implementations in the art, if users have switched to other virtual keyboard types from the default virtual keyboard type in accessing one webpage, the virtual keyboard type may automatically return to the default virtual keyboard type when users jump to another web page. In this scenario, the CAPTCHA, according to the present disclosure, is generated based on the default virtual keyboard type. However, the default virtual keyboard type described herein is not intended to suggest any limitation as to the scope of the present disclosure. In future implementations, in the case where users have switched to other virtual keyboard types from the default virtual keyboard type, in accessing one webpage, even users jump from one webpage to another, the current virtual keyboard type may not automatically return to the default virtual keyboard type but remain the other virtual keyboard type if all these happen within a certain time. In this case, the default virtual keyboard type also applies to the current virtual keyboard type, that is, the CAPTCHA can be generated based on the current virtual keyboard type.

In one embodiment, in accordance with the present disclosure, in response to the default virtual keyboard type being an alphabet virtual keyboard, the CAPTCHA is generated with only alphabets. Herein, the alphabet virtual keyboard provides alphabets in one keyboard without numbers.

In another embodiment, according to the present disclosure, in response to the default virtual keyboard type being a numeric virtual keyboard, the CAPTCHA is generated with only numbers. Herein, the numeric virtual keyboard provides numbers in one keyboard without alphabets.

In yet another embodiment, according to the present disclosure, in response to the default virtual keyboard type being a scratchable-latex virtual keyboard, the CAPTCHA is generated with only alphabets, wherein any adjacent alphabets of the CAPTCHA are not on the same key button of the virtual keyboard.

In further embodiments, according to the present disclosure, in response to the default virtual keyboard type being a full-size virtual keyboard, the CAPTCHA is generated randomly, wherein the full-size virtual keyboard provides numbers and alphabets in one keyboard.

At step S306, sending the CAPTCHA to the handheld touch screen device, normally, the CAPTCHA is included in the resource requested. The resource is sent from server side to the handheld touch screen device side.

Figure 4:
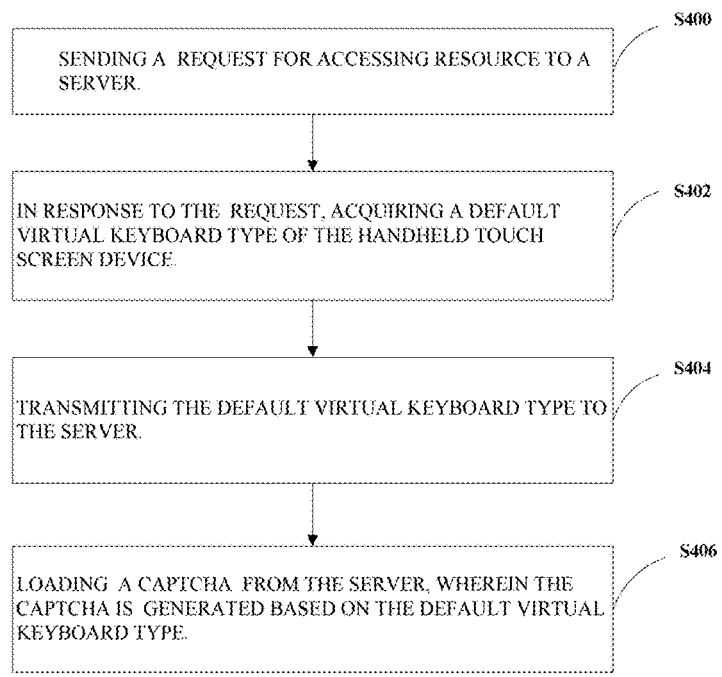
FIG. 4 describes an example method for generating a CAPTCHA for a handheld touch screen device, from the handheld touch screen device side, in accordance with one embodiment of the present invention.

FIG. 4 describes an example method for generating a CAPTCHA for a handheld touch screen device from the handheld touch screen device side in accordance with one embodiment of the present disclosure. The method shown in FIG. 4 may be performed by the handheld touch screen device. The method comprises the following steps.

At step S400, sending a request, for accessing a resource, to a server.

Figure 5:
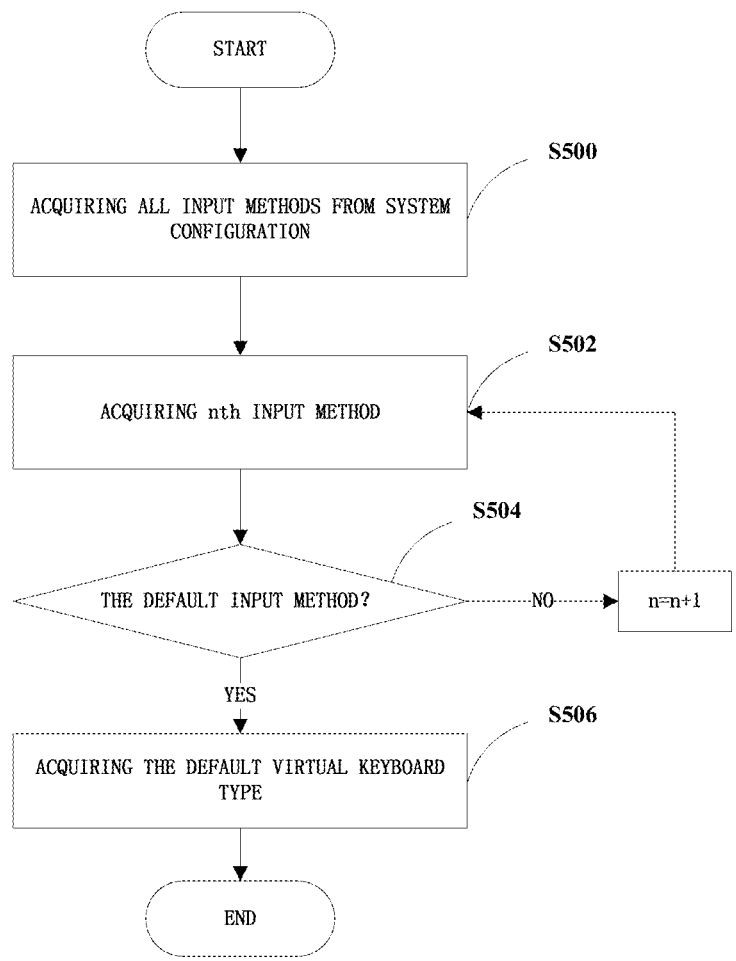
FIG. 5 describes an example flow chart for acquiring a default virtual keyboard type of the handheld touch screen device, in accordance with one embodiment of the present invention.

At step S402, in response to the request, acquiring a default virtual keyboard type of the handheld touch screen device. FIG. 5 describes an example flow chart for acquiring a default virtual keyboard type of the handheld touch screen device in accordance with one embodiment of the present disclosure.

As shown in FIG. 5, the flow chart starts from step S500. At step S500, all input methods are required from the system configuration. The input methods may include, for example, a Chinese input method, an English input method, and a Japanese input method etc. At step S502, nth (herein n≥1, n∈positive integer) input method is acquired from all input methods. At step S504, it is determined whether nth input method is the default input method. Upon the determining result being NO, (n+1) is assigned to n, then the process goes back to step S502. Upon the determining result being YES, another branch will be conducted, i.e., at step S506, the default virtual keyboard type of the default input method is required, then the process ends.

At step S404, transmitting the default virtual keyboard type of the handheld touch screen device to the server. As FIG. 3 described, a CAPTCHA is generated based on the default virtual keyboard type in the server side, which is not repeated here.

At step S406, loading a CAPTCHA from the server, wherein the CAPTCHA is generated based on the default virtual keyboard type. The CAPTCHA is included in the resource sent from the server. After loading the resource, the CAPTCHA is shown up in the web page of the resource.

According to one embodiment of the present disclosure, in response to the virtual keyboard type being an alphabet virtual keyboard, the CAPTCHA is comprised of only alphabets. According to one embodiment of the present disclosure, in response to the virtual keyboard type being a numeric virtual keyboard, the CAPTCHA is comprised of only numbers. In response to the virtual keyboard type being a scratchable-latex virtual keyboard, the CAPTCHA is comprised of only alphabets, wherein any adjacent alphabets of the CAPTCHA are not on the same key button of the scratchable-latex virtual keyboard. In response to the virtual keyboard type being a full-size virtual keyboard, CAPTCHA comprises random alphabets and numbers.

The method of FIG. 4 can be implemented as an application installed on the handheld touch screen device, and can also be implemented as a part of function of the handheld touch screen device.

In some implementations of the present disclosure, users may change the current default virtual keyboard type to a new virtual keyboard type before or after responding the CAPTCHA. In this case, this changing may be detected by the handheld touch screen device side, then the new virtual keyboard type may be sent to the server by the handheld touch screen device (i.e., in response to detecting the change to a new virtual keyboard type from the default virtual keyboard type, the new virtual keyboard type is transmitted to the server).

Figure 6:
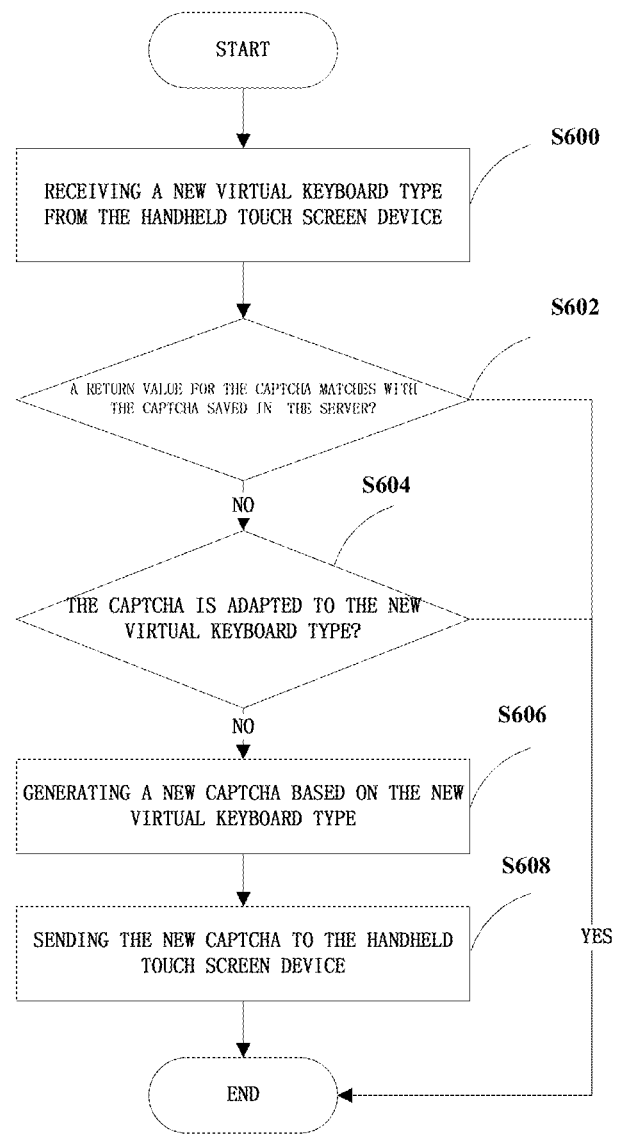
FIG. 6 describes an example flow chart for a CAPTCHA generation mechanism when the default virtual keyboard type is changed to a new virtual keyboard type, in accordance with one embodiment of the present invention.

FIG. 6 describes an example flow chart for a CAPTCHA generation mechanism when the default virtual keyboard type is changed to a new virtual keyboard type in accordance with one embodiment of the present disclosure. As shown in FIG. 6, the method performed by the server side may further comprise the following steps: At step S600, a new virtual keyboard type is received from the handheld touch screen device. At step S602, it is determined whether a return value for the CAPTCHA matches with the CAPTCHA saved in the server, in this embodiment, if no user response is received from the handheld touch screen device, then the return value of the user response may be regarded as "NULL", which means the return value of the user response does not match with the CAPTCHA saved in the server. Upon the determining result being YES, the process ends. Upon the determining result being NO, the process goes to step S604, wherein it is determined whether the CAPTCHA is adapted to the new virtual keyboard type.

For example, in the case that the new virtual keyboard type is a full-size virtual keyboard, the CAPTCHA generated based on the alphabet virtual keyboard, or numeric virtual keyboard, can be adapted to the full-size virtual keyboard. In another example, in the case that the new virtual keyboard type is a scratchable-latex virtual keyboard, the CAPTCHA generated based on the numeric virtual keyboard cannot be adapted to the full-size virtual keyboard. Upon the determining result being YES, the process ends. Upon the determining result being NO, the process goes to step S606, wherein a new CAPTCHA is generated based on the new virtual keyboard type. The generation methods for the new CAPTCHA are shown in FIGS. 3 and 4, which are not repeated here.

At step S608, the new CAPTCHA is sent to the handheld touch screen device from the server side. It should be noted, during the determining in step S604, that the user response for the CAPTCHA is blocked by the process until the whole process has been finished. Correspondingly, in the handheld touch screen device side, in response to detecting a new virtual keyboard type changed from the default virtual keyboard type, sending the new virtual keyboard type to the server. In response to the CAPTCHA not being adapted to the new virtual keyboard type, a new CAPTCHA is received from the server, then the CAPTCHA is replaced by the new CAPTCHA. In response to the CAPTCHA being adapted to the new virtual keyboard type, the CAPTCHA is not changed.

This embodiment implements an adaptive CAPTCHA generation mechanism according to the changes of the virtual keyboard type. In the case that the default virtual keyboard type has been changed to another type of virtual keyboard after receiving a CAPTCHA, based on the default virtual keyboard type, the CAPTCHA can be adapted to the changed virtual keyboard type, and if necessary, a new CAPTCHA may be generated according to the new virtual keyboard type, which is more convenient for users to input a CAPTCHA in the case that users switch among different types of the virtual keyboard.

The following shows some embodiments for generating a CAPTCHA according to the present disclosure. A user named John would access a website from his cell phone. A website accessing request is transmitted from his cell phone to the web server. In response to this request, a default virtual keyboard type of the cell phone is detected by the cell phone.

Figure 7:
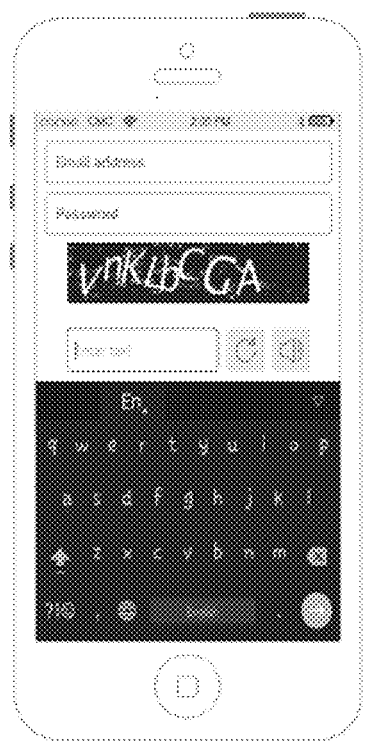
FIG. 7 describes an example CAPTCHA for a cell phone, in accordance with one embodiment of the present invention.

FIG. 7 describes an example CAPTCHA for a cell phone in accordance with one embodiment of the present disclosure. As shown in FIG. 7, the detected default virtual keyboard type of the cell phone is an alphabet virtual keyboard type, which is transmitted to the web server. On the web server side, in response to the virtual keyboard type being an alphabet virtual keyboard, the CAPTCHA is generated with only alphabets. As shown in FIG. 7, the default alphabet virtual keyboard is shown in the lower part of the user interface of the cell phone, and the generated CAPTCHA "VnKLbCGA" is displayed in the upper part of the login page shown in the user interface of the cell phone. Since the CAPTCHA "VnKLbCGA" is not mixed with any numbers, there is no need to switch between an alphabet virtual keyboard and a numeric virtual keyboard, which brings convenience to the user.

Figure 8:
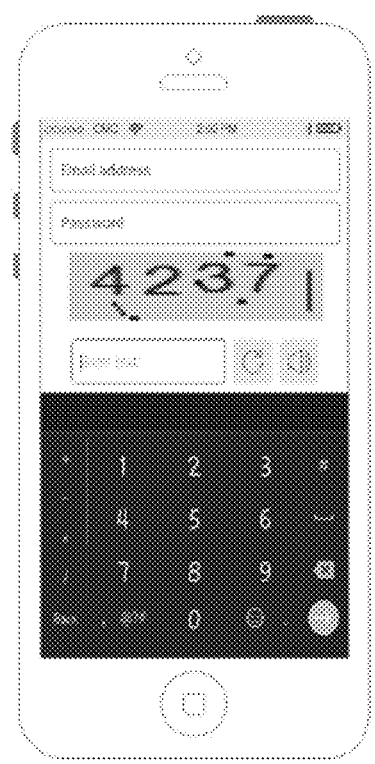
FIG. 8 describes another example CAPTCHA for a cell phone, in accordance with one embodiment of the present invention.

FIG. 8 describes another example CAPTCHA for a cell phone in accordance with one embodiment of the present disclosure. As shown in FIG. 8, the detected default virtual keyboard type of the cell phone is a numeric virtual keyboard type, which is transmitted to the web server. On the web server side, in response to the virtual keyboard type being a numeric virtual keyboard, the CAPTCHA is generated with only numbers. As shown in FIG. 8, the default numeric virtual keyboard is shown in the lower part of the user interface of the cell phone, and the CAPTCHA "42371" is displayed in the upper part of the login page shown in the user interface of the cell phone. Since the CAPTCHA "42371" is not mixed with any alphabet letters, there is no need to switch between a numeric virtual keyboard and an alphabet virtual keyboard, which brings convenience to the user.

Figure 9:
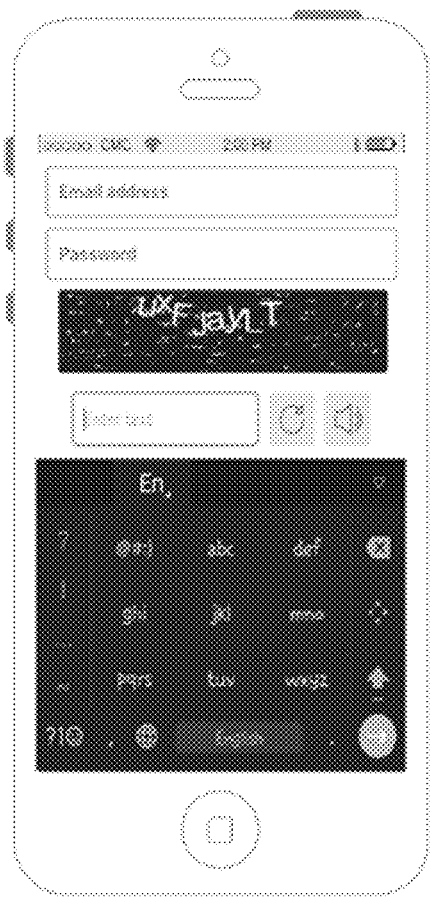
FIG. 9 describes another example CAPTCHA for a cell phone, in accordance with one embodiment of the present invention.

FIG. 9 describes yet another example CAPTCHA for a cell phone according to one embodiment of the present disclosure. As shown in FIG. 9, the detected default virtual keyboard type of the cell phone is a scratchable-latex virtual keyboard type, which is transmitted to the web server. On the web server side, in response to the virtual keyboard type being a scratchable-latex virtual keyboard, the CAPTCHA is generated with only alphabet letters (or alphabets), wherein any adjacent alphabet letters of the CAPTCHA are not from the same key button of the scratchable-latex virtual keyboard. As shown in FIG. 9, the default scratchable-latex virtual keyboard is shown in the lower part of the user interface of the cell phone, and the generated CAPTCHA "UXFJaYLT" is displayed on the login page shown in the upper part of the user interface of the cell phone. Since the generated CAPTCHA "UXFJaYLT" is not mixed with any numbers, nor are any adjacent alphabet letters of the CAPTCHA "UXFJaYLT" from the same key button of the scratchable-latex virtual keyboard, there is no need for the user to wait a short time for inputting the next alphabet letter, which brings convenience to the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A "Completely Automated Public Turing test to tell Computers and Humans Apart" (CAPTCHA) generation method, comprising:
   receiving, by a server, a request to access a resource from a handheld touch screen device, the request including a default virtual keyboard type of the handheld touch screen device;
   the server generating a CAPTCHA based on the default virtual keyboard type, the default virtual keyboard type selected from a group comprising an alphabet virtual keyboard, a numeric virtual keyboard, a scratchable-latex virtual keyboard and a full-size virtual keyboard;
   the generated CAPTCHA consisting of:
      in response to the default virtual keyboard type being the alphabet virtual keyboard, only alphabets;
      in response to the default virtual keyboard type being the numeric virtual keyboard, only numbers;

in response to the default virtual keyboard type being the scratchable-latex virtual keyboard, only alphabets, wherein any adjacent alphabets of the CAPTCHA are not on a same key button of the scratchable-latex virtual keyboard; and in response to the default virtual keyboard type being the full-size virtual keyboard, random alphabets and numbers;

the server transmitting the generated CAPTCHA to the handheld touch screen device; and displaying the generated CAPTCHA on the handheld touch screen device.

2. The CAPTCHA generation method of claim 1, further comprising:

in response to the handheld touch screen device detecting a new virtual keyboard type changed from the default virtual keyboard type, the handheld touch screen device sending the new virtual keyboard type to the server.

3. The CAPTCHA generation method of claim 2, further comprising:

in response to the server determining that the generated CAPTCHA is not adapted to the new virtual keyboard type, the server transmitting a new CAPTCHA to the handheld touch screen device.

4. The CAPTCHA generation method of claim 3, further comprising:

in response to receiving a new CAPTCHA from the server, the handheld touch screen device replacing the generated CAPTCHA with the new CAPTCHA.

5. A CAPTCHA generation system comprising a computer processor coupled to a non-transitory computer-readable memory unit, said memory unit comprising instructions that when executed by the computer processor implements a method comprising:

receiving, by a server, a request to access a resource from a handheld touch screen device, the request including a default virtual keyboard type of the handheld touch screen device;

the server generating a CAPTCHA based on the default virtual keyboard type, the default virtual keyboard type selected from a group comprising an alphabet virtual keyboard, a numeric virtual keyboard, a scratchable-latex virtual keyboard and a full-size virtual keyboard;

the generated CAPTCHA consisting of:

in response to the default virtual keyboard type being the alphabet virtual keyboard, only alphabets;

in response to the default virtual keyboard type being the numeric virtual keyboard, only numbers;

in response to the default virtual keyboard type being the scratchable-latex virtual keyboard, only alphabets, wherein any adjacent alphabets of the CAPTCHA are not on a same key button of the scratchable-latex virtual keyboard; and in response to the default virtual keyboard type being the full-size virtual keyboard, random alphabets and numbers; the server transmitting the generated CAPTCHA to the handheld touch screen device; and displaying the generated CAPTCHA on the handheld touch screen device.

6. The CAPTCHA generation system of claim 5, further comprising:

in response to the handheld touch screen device detecting a new virtual keyboard type changed from the default virtual keyboard type, the handheld touch screen device sending the new virtual keyboard type to the server.

7. The CAPTCHA generation system of claim 6, further comprising:

in response to the server determining that the generated CAPTCHA is not adapted to the new virtual keyboard type, the server transmitting a new CAPTCHA to the handheld touch screen device.

8. The CAPTCHA generation system of claim 7, further comprising:

in response to receiving a new CAPTCHA from the server, the handheld touch screen device replacing the generated CAPTCHA with the new CAPTCHA.

9. A computer program product for generating a CAPTCHA, the computer program product comprising a non-transitory computer readable storage medium having program instructions embodied therewith, the program instructions executable by a device to cause the electronic device to perform a method comprising:

receiving, by a server, a request to access a resource from a handheld touch screen device, the request including a default virtual keyboard type of the handheld touch screen device;

the server generating a CAPTCHA based on the default virtual keyboard type, the default virtual keyboard type selected from a group comprising an alphabet virtual keyboard, a numeric virtual keyboard, a scratchable-latex virtual keyboard and a full-size virtual keyboard;

the generated CAPTCHA consisting of:

in response to the default virtual keyboard type being the alphabet virtual keyboard, only alphabets;

in response to the default virtual keyboard type being the numeric virtual keyboard, only numbers;

in response to the default virtual keyboard type being the scratchable-latex virtual keyboard, only alphabets, wherein any adjacent alphabets of the CAPTCHA are not on a same key button of the scratchable-latex virtual keyboard; and in response to the default virtual keyboard type being the full-size virtual keyboard, random alphabets and numbers;

the server transmitting the generated CAPTCHA to the handheld touch screen device; and displaying the generated CAPTCHA on the handheld touch screen device.

10. The computer program product of claim 9, further comprising:

in response to the handheld touch screen device detecting a new virtual keyboard type changed from the default virtual keyboard type, the handheld touch screen device sending the new virtual keyboard type to the server.

11. The computer program product of claim 10, further comprising:

in response to the server determining that the generated CAPTCHA is not adapted to the new virtual keyboard type, the server transmitting a new CAPTCHA to the handheld touch screen device.

12. The computer program product of claim 11, further comprising:

in response to receiving a new CAPTCHA from the server, the handheld touch screen device replacing the generated CAPTCHA with the new CAPTCHA.

* * * * *